United States Patent [19]
Holloway et al.

[11] 3,918,936
[45] Nov. 11, 1975

[54] PARTICULATE LEAD TRAP

[75] Inventors: John G. Holloway, Oakmont; Herbert W. Barch, Natrona Heights, both of Pa.

[73] Assignee: PPG Industries, Inc., Pittsburgh, Pa.

[22] Filed: July 23, 1974

[21] Appl. No.: 490,836

Related U.S. Application Data

[63] Continuation of Ser. No. 194,105, Nov. 1, 1971, abandoned.

[52] U.S. Cl. ............ 55/97; 55/350; 55/482; 55/524; 55/527; 55/DIG. 25; 55/DIG. 30; 60/311
[51] Int. Cl.² .................................... B01D 50/00
[58] Field of Search . 55/350, 97, DIG. 30, DIG. 25, 55/482, 524, 527, 528; 60/311

[56] References Cited
UNITED STATES PATENTS

| | | | |
|---|---|---|---|
| 3,397,034 | 8/1968 | Tulleners et al. | 55/DIG. 30 |
| 3,485,593 | 12/1969 | Lenane | 55/DIG. 30 |
| 3,594,993 | 7/1971 | Heyse | 55/524 |

Primary Examiner—Bernard Nozick
Attorney, Agent, or Firm—John E. Curley; Robert DeMajistre

[57] ABSTRACT

An improved method for treating automotive exhaust gases is described which involves the utilization of an agglomerating device coupled to a specially constructed fiber glass filter in series in an automotive exhaust system. The filter employed involves the utilization of fiber glass needled mat preferably in the form of layers of mat held in place so that gases passing through the exhaust system must pass through the matted fibers in their passage through the device.

4 Claims, 4 Drawing Figures

PARTICULATE LEAD TRAP

This is a continuation of application Ser. No. 194,105, filed Nov. 1, 1971, now abandoned.

BACKGROUND OF THE INVENTION

Concern has been expressed by federal and state governments as well as by industry in recent years in solving the problems of atmospheric pollution caused by the exhaust gas emissions of internal combustion engines and in particular the emissions in automotive exhaust gases. These emissions on a volume basis are primarily gases such as oxides of carbon, nitrogen oxides and unburned hydrocarbons. In addition the use of leaded fuel in gasoline contributes lead particulates to automotive exhaust gases and the presence of these particulates in automotive exhaust gases has also become a matter of considerable concern to both industry and government. Concern of government appears to center around the question of whether or not these particulate lead emissions represent a health hazard; a question still apparently unresolved. The concern of industry over these particulates centers on their effect on catalytic muffler systems designed to reduce gaseous emissions such as hydrocarbons, carbon monoxide and nitrogen oxides. One obvious solution to the problem of lead particulate emissions is the removal of lead from gasoline. This has already resulted in legislation on state and federal levels limiting the quantities of lead in gasoline. Because of the unique nature of lead in gasoline and its beneficial properties in increasing gasoline in octane values, its removal necessitates further refining of normal gasoline stock to produce gasolines with low lead that have adequate octane ratings for automotive use. The further processing of gasoline to compensate for loss of lead tends to increase the price of gasoline and also results in the depletion of petroleum field stocks, neither of these being desirable. Thus, an effective method of permitting leaded gasoline to continue to be used while eliminating lead particulate emissions is desirable so that low cost, high octane gasolines can still be utilized in automotive systems. Such a method will benefit the petroleum industry in that fuel reserves will not be reduced by producing super refined gasolines needed to supply current high octane leaded fuels.

THE PRESENT INVENTION

In accordance with the instant invention a method of treating exhaust gases for this purpose have been provided which effectively remove particulate lead from the exhaust gases of an internal combustion engine and automobile exhaust gases in particular. The method of the instant invention involves passing the exhaust gases at high temperature, i.e., 700°F. or higher, typically 700°F. to 900°F. through an agglomeration device composed of a fiber glass mat to cause impingement of the lead particulates contained in the automotive exhaust gas upon each other and upon the fiber glass through which they must pass and subsequently passing gases having their particulates so agglomerated through a needled fiber glass filter located in a position in the exhaust gas system of a conventional automobile so that the gases entering the needled mat fiber glass filter located downstream of the agglomeration system is at a temperature below 700°F. It is found in operating jointly a fiber glass mat agglomerator in conjunction with a fiber glass mat filter that a substantial portion of the lead passed through the engine of an automobile is removed utilizing these filters.

The invention will be more readily understood with reference to the accompanying drawing in which.

Figure 1:
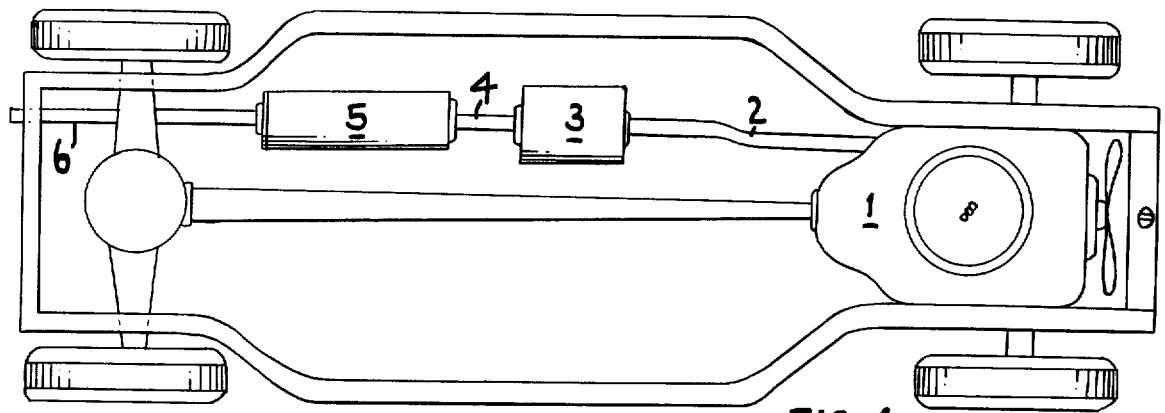
FIG. 1 is a plan view of the bottom of an automobile showing the agglomerator and fiber glass filter located in the exhaust system in series.

Turning to the drawing there is shown in FIG. 1 the underside of a conventional automobile having an engine 1 and an exhaust pipe 2. Connected to the exhaust pipe 2 downstream of the engine is an agglomerator device 3 which is connected in series via pipe 4 to filter 5. The exhaust gases are removed from filter 5 via conduit 6.

Figure 2:
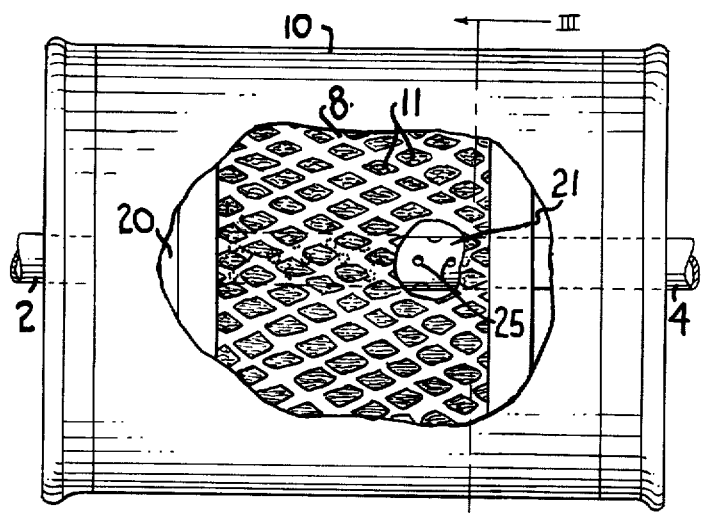
FIG. 2 is an enlarged plan view of the agglomerator of FIG. 1 partially broken away to show the internal configuration of the fiber glass mat.
Figure 3:
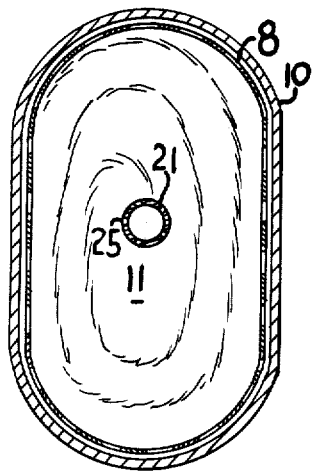
FIG. 3 is a cross section of FIG. 2 taken along lines 3—3 to show the positioning of the needled mat inside of the agglomerator.

As shown in more detail in FIGS. 2 and 3, agglomerator 3 is composed of a housing 10 which has in the interior portions of it a fiber glass mat 11 which is rolled in generally an oval shape as shown in FIG. 3 to conform to the contours of the agglomerator 3. The fiber glass mat is held in place by a metal screen 8 which surrounds the mat and holds it snugly around the screen. The screen 8 and mat 11 are held in place by the housing 10. If desired, the housing 10 may contain a removable top so that the device can be recharged at regular intervals with fresh fiber glass mat.

Figure 4:
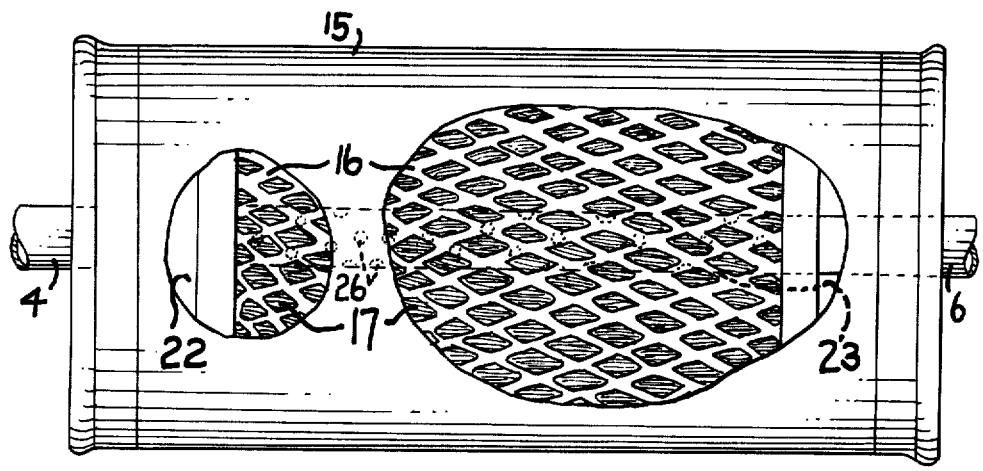
FIG. 4 is a plan view partially broken away of the filter device of FIG. 1.

In FIG. 4 the filter 5 is shown in detail and is composed of a housing 15 having placed therein a screen member 16. The screen 16 contains the fiber glass mat 17 forming the filter element of this structure. While not shown in the drawing, the housing 15 may contain a removable plate of sufficient dimension to permit removal of the screen and mat at any desired intervals for replacement.

In general both the agglomerator 3 and filter 5 are constructed so that gas spaces 20 and 22 are provided at one end thereof. Thus the screen and mat are sized such that a gas space 20 is provided between the inlet wall of housing 10 of the agglomerator and the screen 8 and mat 11 contained therein. A centrally disposed tube 21 provided with inlets or openings 25 along the long axis in the area of the screen 8 and mat 11 terminates as a solid tube with outlet 4. In the filter 5 similarly the screen 16 and fiber glass mat 17 are proportioned in size to provide a gas inlet space 22 on the inlet end of the filter. A centrally disposed tube 23 is provided in the filter 5 and has a plurality of openings 26 along the long axis in the area of the tube which is surrounded by the mat 17 and screen 16. The end of tube 23 is closed and is in gas communication with exit tube 6. The fiber glass mat 17 in the filter 5 is positioned in the filter in the same manner mat 11 of FIG. 3 is positioned therein.

Housing 10 is proportioned to be slightly larger than the screen 8 in agglomerator 3 as is housing 15 larger than screen 16 in filter 5. Thus, gases entering space 20 flow between the housing 10 and screen 8 pass through the mat 11 to the openings in tube 21. The gases then pass from tube 21 out exhaust 4. In like fashion gases entering space 22 of filter 5 pass between housing 15 and screen 16 and then downwardly through mat 17 to the openings in tube 23. From this tube the gases are passed to exhaust conduit 6.

The placement of the agglomerator device 3 in the automotive system is of some importance as is the placement of the filter 5. Thus, in the automotive systems in which these devices are employed, the agglomerator should be placed in a location that insures that the gases it encounters are in a temperature range of 700°F. to about 900°F. The filter 5 is placed in the same system at a location that insures that the gas temperature of gas entering the unit is 500°F. or less. It has been found that at the 700°F. 900° F. range the agglomeration device operates very effectively in producing large particulates of lead in automotive exhaust gases which can be subsequently trapped in a fiber glass mat filter such as unit 3. The placing of the filter 3 in a location that insures gas temperatures of 500°F. or less assists in removing a substantial portion of all particulate lead contained in automotive exhaust gases from engines using a leaded fuel.

The fiber glass mat employed in the instant invention may be any type of fiber glass matting. A particularly effective material is a needled mat. These mats may be prepared as shown and described in assignee's copending application Ser. No. 22,535, filed Mar. 25, 1970 now U.S. Pat. No. 3,713,962 which is incorporated herein by reference.

The fiber glass mats used in the filter 5 and agglomerator 3 have a suitable binder affixed to the fiber glass to insure the thermal stability of the mats at the high temperatures encountered.

A particularly acceptable binder for this purpose is a benzophenone dianhydride-metaphenylene diamine reaction product in a solvent of ethanol-N-methyl-2-pyrrolidone on a 30 to 70 percent volume basis ethanol to N-methyl pyrol. Other solvents for the reaction product used may be dimethylacetamide, dimethylforamamide, dimethylsulfoxide and pyridine. In lieu of metaphenylenediamine other aromatic diamines such as 4,4-diaminophenyl ether may be used.

In applying the binder to the fiber glass the reaction product of the dianhydride-diamine in its carrier solvent is preferably made water soluble by adding it to or adding to it, water containing a member of the group consisting of alkali metal hydroxides and ammonium hydroxide. Typical alkali metal hydroxides are sodium, potassium and lithium hydroxide. Ammonium hydroxide is preferred. Thus, in the preferred embodiment a benzophenone dianhydride-metaphenylene diamine reaction product in ethanol-N-methyl-2-pyrrolidone solvent is added to an aqueous ammonium hydroxide solution. Typically on a weight basis the solution is about 8 percent. If desired the aromatic dianhydride-aromatic diamine in its organic solvent can be applied to the mats without the use of water.

The fiber glass mats in the preferred method of preparation are placed in an aqueous solution of ammonium hydroxide, typically 1 to 5 percent by weight, which has dissolved therein a benzophenone dianhydride-metaphenylene diamine reaction product prepolymer. After thoroughly wetting the mats, they are removed from the bath and air dried for 1 hour at 300°F. The binder is then cured on the mat by heating the mat for 4 hours in an oven at 600°F.

In a specific embodiment a water bath containing high temperature binder was prepared in which on a 900 gram basis the bath contained 891.18 grams of water, 1.35 grams of ammonium hydroxide and 7.47 grams of Skybond 700 (manufactured by Monsanto Company), a benzophenone dianhydride-aromatic diamine in an ethanol-N-methyl-2-pyrrolidone solvent. To a bath containing these ingredients in these proportions were placed two needled fiber glass mats. After thorough wetting, the mats were air dried at 300°F. for 1 hour and cured at 600°F. for 4 hours. Mats prepared in this manner were rolled and placed in the agglomerator housing 10 and the filter housing 15. The agglomerator 3 was used in lieu of the normal foreward muffler of the car and the filter unit 15 was used in lieu of the rear muffler. The automobile was a 1965 Lincoln Continental sedan. After operating the automobile for 4,825 miles under normal driving conditions with leaded fuel, a total of 2,044 grams of particulate emissions were collected. The filter unit 5 showed no signs of thermal degradation upon visual inspection.

While the invention has been described with reference to certain specific embodiments, it is not intended that the invention be limited thereby except insofar as appears in the accompanying claims.

We claim:

1. A method of treating automotive exhaust gases to remove particulate lead therefrom comprising:
    passing the gases from an engine and containing lead particulates through an agglomeration zone operating at a temperature between 700°F. and 900°F. and containing therein a fiber glass mat having a resin binder to bind fibers which is capable of withstanding temperatures of 900°F.;
    passing all of the gases through said agglomeration zone and said fiber glass mat;
    agglomerating lead particulates contained in said gases by impinging said lead particulates upon each other and upon said glass fiber mat;
    removing the gases from said agglomeration zone;
    providing a filtration zone filled with fiber glass mat having a resin binder to bind fibers capable of withstanding 500°F.;
    passing the gases through said mat filtration zone at a temperature of 500°F. or less;
    removing particulate lead by filtration in said filtration zone; and
    removing from said filtration zone a gas stream of substantially reduced particulate lead content.

2. A method of claim 1 wherein the fiber glass mat in the agglomeration zone is a needled mat.

3. A method of claim 1 wherein the fiber glass mat in the filtration zone is a needled mat.

4. A method of treating automotive exhaust gases to remove particulates therefrom comprising:
    passing the gases from an engine and containing particulates through an agglomeration zone operating at a temperature between 700°F. and 900°F.;
    providing a fiber glass mat having a resin binder to bind fibers capable of withstanding 900°F. in said agglomeration zone;
    passing all of the gases through said agglomeration zone and said fiber glass mat;
    agglomerating particulates contained in said gases by impinging said particulates upon each and upon said glass fiber mat;
    removing the gases from said agglomeration zone;

providing a filtration zone filled with fiber glass mat having a resin binder to bind fibers capable of withstanding 500°F.;
passing the gases through said filtration zone and said mat at a temperature of 500°F. or less;

removing particulates filtration in said filtration zone; and
removing from said filtration zone a gas stream of substantially reduced particulate content.

* * * * *

UNITED STATES PATENT OFFICE
CERTIFICATE OF CORRECTION

PATENT NO. : 3,918,936
DATED : November 11, 1975
INVENTOR(S) : John G. Holloway
Herbert W. Barch It is certified that error appears in the above-identified patent and that said Letters Patent are hereby corrected as shown below:

In the Abstract, after "method" insert --and apparatus--.

Column 1, line 59, after "passing" insert --the--.

Column 2, line 64, after "8" insert --and--.

Column 3, line 13, after "700°F." insert --to--.

Column 6, line 20, Claim 4, after "particulates" insert --by--.

Signed and Sealed this twenty-seventh Day of April 1976

[SEAL]

Attest:

RUTH C. MASON
Attesting Officer

C. MARSHALL DANN
Commissioner of Patents and Trademarks